(12) United States Patent
Chang et al.

(10) Patent No.: US 8,789,436 B2
(45) Date of Patent: Jul. 29, 2014

(54) BALL SCREW DEVICE HAVING PRELOAD STRUCTURE

(71) Applicants: Che Kang Chang, Taichung (TW); Zong Sian Jiang, Taichung (TW)

(72) Inventors: Che Kang Chang, Taichung (TW); Zong Sian Jiang, Taichung (TW)

(73) Assignee: Hiwin Technologies Corp., Situn Taichung (TW)

( * ) Notice: Subject to any disclaimer, the term of this patent is extended or adjusted under 35 U.S.C. 154(b) by 121 days.

(21) Appl. No.: 13/648,374

(22) Filed: Oct. 10, 2012

(65) Prior Publication Data

US 2014/0096633 A1   Apr. 10, 2014

(51) Int. Cl.
  *F16C 43/00*   (2006.01)
  *F16C 33/60*   (2006.01)
  *F16H 1/24*   (2006.01)
  *F16H 55/02*   (2006.01)

(52) U.S. Cl.
  USPC .................... 74/424.82; 384/542; 384/506

(58) Field of Classification Search
  CPC ..... F16H 25/20; F16H 25/2204; F16H 25/24; F16C 19/548; F16C 35/073
  USPC ............... 74/424.71, 424.81, 424.82, 89.23; 384/542, 40, 626, 505, 506, 517
  See application file for complete search history.

(56) References Cited

U.S. PATENT DOCUMENTS

| | | | | |
|---|---|---|---|---|
| 3,154,954 A | * | 11/1964 | Geyer | 74/89.35 |
| 3,367,201 A | * | 2/1968 | Orner | 74/424.86 |
| 3,651,550 A | * | 3/1972 | Bennett | 29/898.09 |
| 4,730,946 A | * | 3/1988 | Cain | 384/506 |
| 4,939,946 A | * | 7/1990 | Teramachi | 74/89.3 |
| 6,406,188 B1 | * | 6/2002 | Lin et al. | 384/504 |
| 6,708,577 B2 | | 3/2004 | Pizzoni et al. | |
| 6,752,245 B2 | | 6/2004 | Tsukada et al. | |
| 6,817,260 B2 | | 11/2004 | Liao | |
| 7,278,333 B2 | | 10/2007 | Kato et al. | |
| 7,350,434 B2 | | 4/2008 | Nishimura et al. | |
| 8,082,814 B2 | | 12/2011 | Jiang et al. | |

* cited by examiner

*Primary Examiner* — Justin Krause
(74) *Attorney, Agent, or Firm* — Charles E. Baxley

(57) ABSTRACT

A ball screw device includes a screw engaged into a nut member for forming an endless ball guiding passage and for receiving bearing members, the nut member includes a thickness reduced barrel for forming a peripheral surface in the nut member, a tubular member is engaged onto the barrel of the nut member, a number of bearing elements are engaged onto the nut member and the tubular member, a sleeve is engaged onto the nut member and includes an inner peripheral protrusion having two curved side surfaces for engaging with the bearing elements and for solidly and stably anchoring and retaining the bearing elements between the sleeve and the tubular member and the nut member.

12 Claims, 8 Drawing Sheets

BALL SCREW DEVICE HAVING PRELOAD STRUCTURE

BACKGROUND OF THE INVENTION

1. Field of the Invention

The present invention relates to a ball screw device, and more particularly to a ball screw device including a preload structure or device for allowing the roller or ball bearing elements to be suitably attached or mounted or secured or engaged into the ball nut and for allowing the ball nut to be easily and quickly assembled and engaged onto the ball screw and for allowing the roller or ball bearing elements to be suitably and smoothly moved through the endless ball guiding passage of the ball screw device.

2. Description of the Prior Art

Typical ball screw devices comprise a ball nut threaded or engaged onto an elongated bolt or ball screw and rotatable and movable or adjustable along the screw, one or more endless ball guiding passages formed in the ball screw device for slidably receiving the ball bearing members, and one or more ball return pipes attached onto the ball screw device for guiding the ball bearing members to smoothly and suitably move through the endless ball guiding passages of the ball screw device.

For example, U.S. Pat. No. 6,708,577 to Pizzoni et al., U.S. Pat. No. 6,752,245 to Tsukada et al., U.S. Pat. No. 6,817,260 to Liao, U.S. Pat. No. 7,278,333 to Kato et al., U.S. Pat. No. 7,350,434 to Nishimura et al., and U.S. Pat. No. 8,082,814 to Jiang et al. disclose several of the typical ball screw return systems each comprising a ball nut threaded or engaged onto an elongated bolt or ball screw and rotatable and movable or adjustable along the screw, one or more endless ball guiding passages formed in the ball screw device for slidably receiving the ball bearing members, and one or more ball return pipes engaged onto the ball nut for guiding the ball bearing members to smoothly move through the endless ball guiding passage of the ball screw and nut combination.

However, the ball bearing members may not be easily and quickly assembled and engaged into the ball nut, and may not be smoothly move through the endless ball guiding passage of the ball screw and nut combination.

The present invention has arisen to mitigate and/or obviate the afore-described disadvantages of the conventional ball screw devices or combinations.

SUMMARY OF THE INVENTION

The primary objective of the present invention is to provide a deflecting device including a preload structure or device for allowing the roller or ball bearing elements to be suitably attached or mounted or secured or engaged into the ball nut and for allowing the ball nut to be easily and quickly assembled and engaged onto the ball screw and for allowing the roller or ball bearing elements to be suitably and smoothly moved through the endless ball guiding passage of the ball screw device.

In accordance with one aspect of the invention, there is provided a ball screw device comprising an elongated screw including a helical groove formed therein, a nut member including a bore formed therein for receiving and engaging with the screw, and including a helical groove aligned with the helical groove of the screw for forming an endless ball guiding passage between the nut member and the screw, the nut member including a first end portion, and including a barrel provided and extended on the first end portion of the nut member and having an outer diameter smaller than that of the nut member for forming a peripheral surface in the nut member, and including an outer peripheral recess formed in the nut member, a number of bearing members engaged with the endless ball guiding passage between the nut member and the screw, a number of first bearing elements engaged with the outer peripheral recess of the nut member, a sleeve including a chamber formed therein for receiving and engaging with the nut member, and including an inner peripheral protrusion extended radially and inwardly into the chamber of the sleeve, the inner peripheral protrusion including an inner diameter greater than that of the nut member for allowing the first bearing elements to be received and engaged between the sleeve and the nut member, and the sleeve including a first curved side surface and a second curved side surface formed on the protrusion, the first curved side surface of the sleeve being engaged with the first bearing elements for stably and solidly anchoring and retaining the first bearing elements between the inner peripheral protrusion of the sleeve and the peripheral recess of the nut member, a tubular member including a compartment formed therein for receiving and engaging with the barrel of the nut member and for engaging onto the barrel of the nut member, and including an outer peripheral depression formed therein, and a number of second bearing elements engaged with the outer peripheral depression of the tubular member, and the second curved side surface of the sleeve is engaged with the second bearing elements for stably and solidly anchoring and retaining the second bearing elements between the inner peripheral protrusion of the sleeve and the tubular member.

The sleeve includes a length greater than that of the tubular member. The first curved side surface of the sleeve include a curvature of a quarter of a circle. The second curved side surface of the sleeve include a curvature of a quarter of a circle. The first and the second curved side surfaces of the sleeve are faced toward opposite direction.

The nut member includes a number of screw holes formed in the peripheral surface of the nut member, and the tubular member includes a number of apertures formed therein and aligned with the screw holes of the nut member for receiving and engaging with fasteners which are threaded or engaged with the screw holes of the nut member. The screw holes of the nut member are parallel to the barrel and the bore of the nut member.

The nut member include a peripheral swelling formed and provided thereon, and the peripheral swelling includes an outer diameter greater than that of the barrel and great than that of the nut member. One or more, such as two curved members may further be provided and attached and engaged between the peripheral surface of the nut member and the tubular member. The curved members each include a semi-circular structure for suitably engaging with the peripheral surface of the nut member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
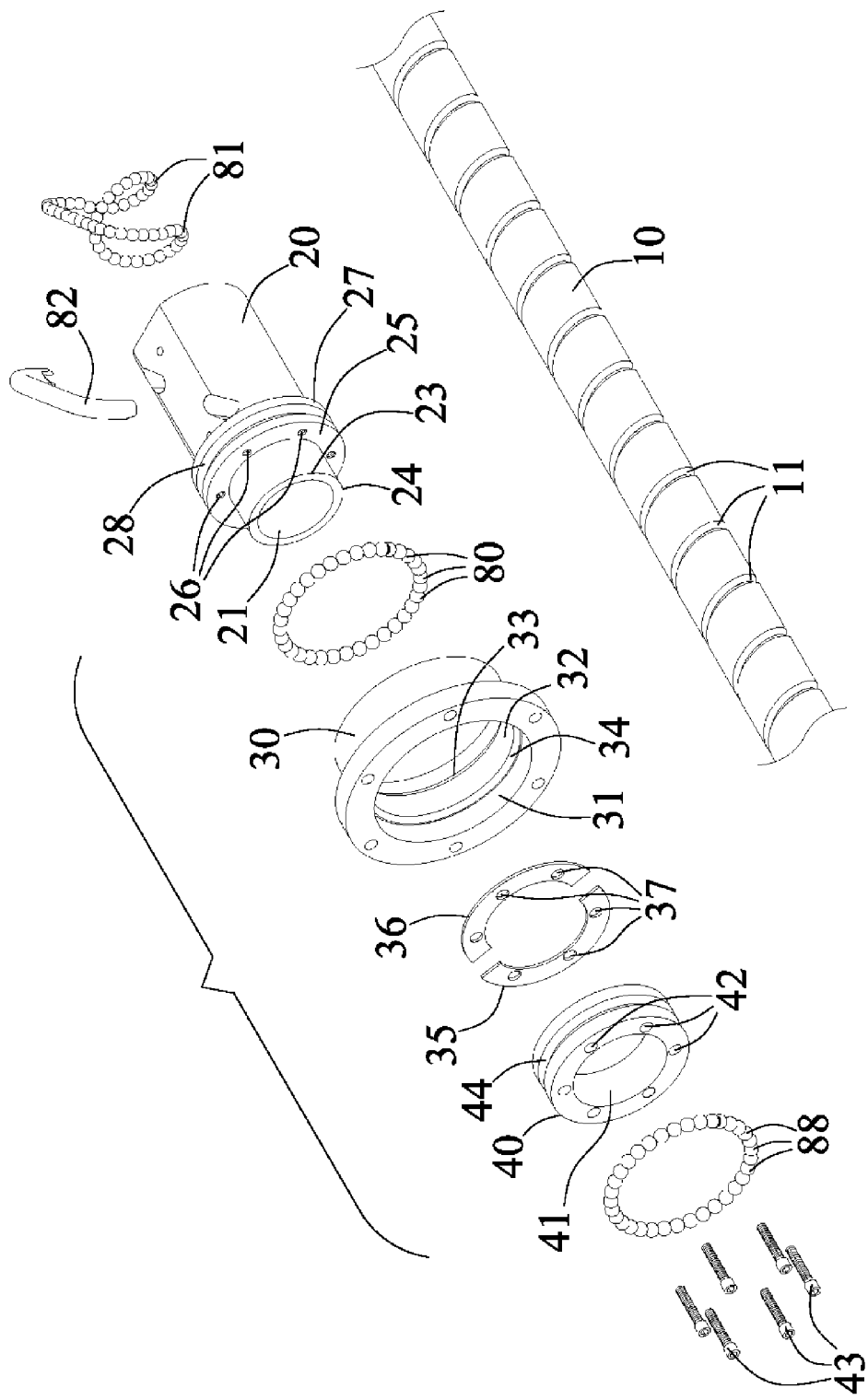
FIG. 1 is a partial exploded view of a ball screw device including a preload structure or device or configuration in accordance with the present invention.
Figure 2:
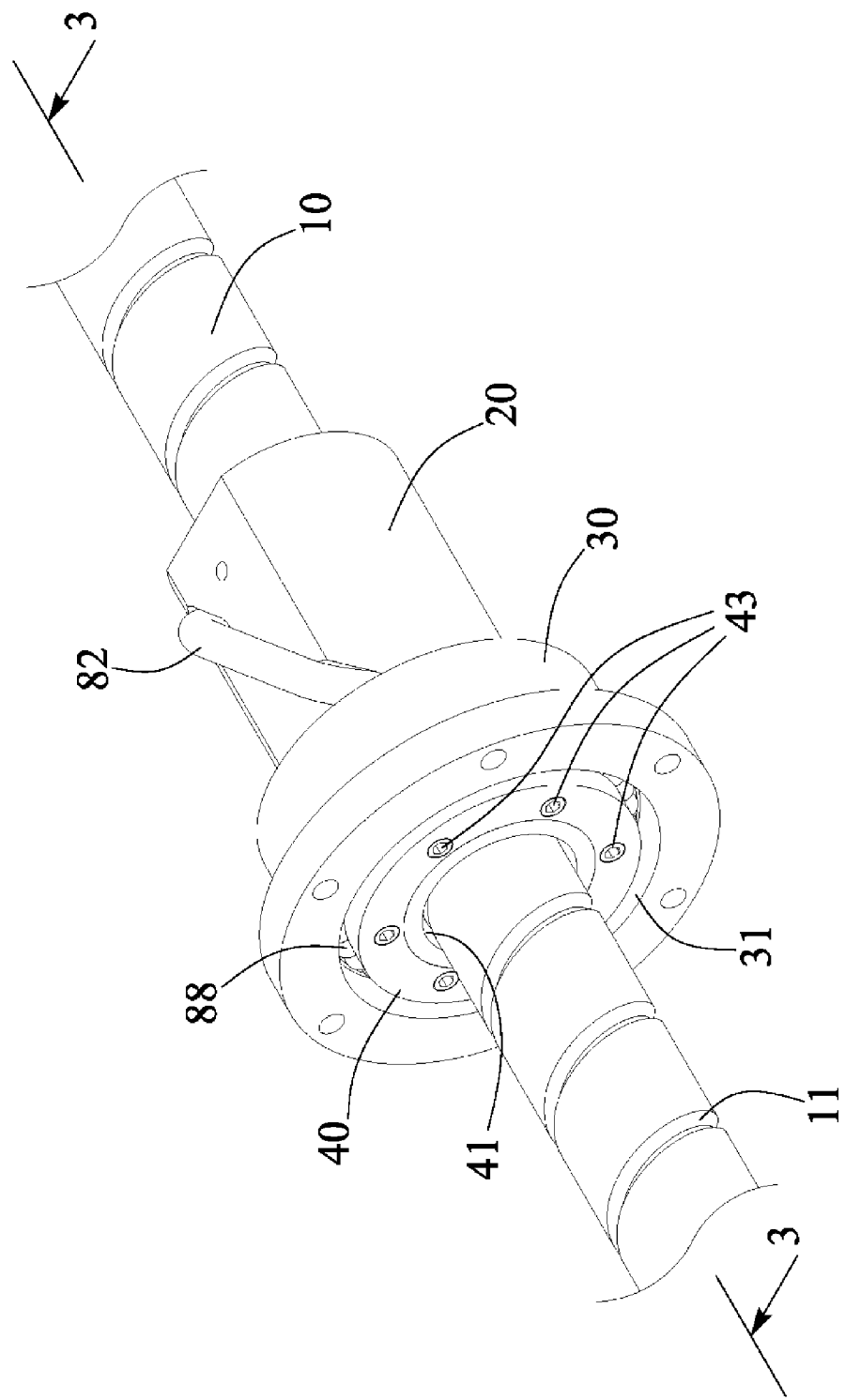
FIG. 2 is a partial perspective view of the ball screw device.
Figure 3:
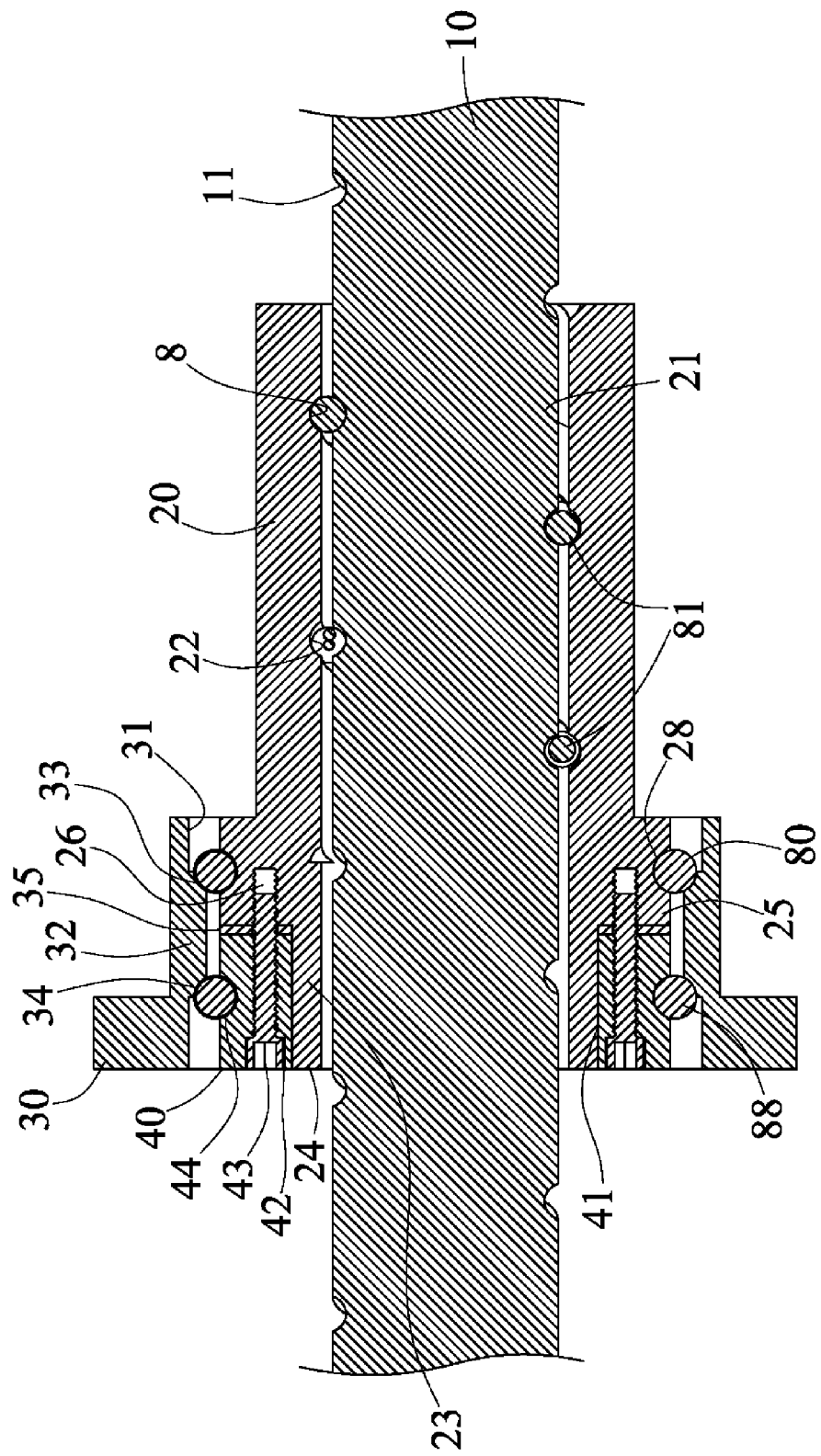
FIG. 3 is a partial cross sectional view of the ball screw device taken along lines 3-3 of FIG. 2.

Referring to the drawings, and initially to FIGS. 1-3, a ball screw device in accordance with the present invention comprises an elongated bolt or ball screw 10 including a helical threaded portion or groove 11 formed therein, such as formed on the outer peripheral portion thereof, and a ball nut or nut member 20 including a bore 21 formed therein for slidably and pivotally or rotatably receiving or engaging with the screw 10, and including another helical threaded portion or groove 22 formed therein and directed to or aligned with the corresponding helical threaded portion or groove 11 of the screw 10 for forming or defining one or more endless ball guiding passages 8 in the ball screw device or between the nut member 20 and the screw 10 and for slidably receiving or engaging with the ball bearing members 81 and thus for allowing the nut member 20 to be suitably and smoothly rotated or adjusted and moved along the screw 10.

One or more deflecting members or devices 82 may further be provided and attached or mounted or secured or engaged onto the nut member 20 for forming or defining the endless ball guiding passages 8 in the ball screw device or between the nut member 20 and the screw 10. The above-described structure or configuration for the connection or coupling between the nut member 20 and the screw 10 and the ball bearing members 81 and the deflecting members or devices 82 is typical and is not related to the present invention and will not be described in further details. The nut member 20 further includes narrowed or diameter-reduced tube or conduit or barrel 23 formed or provided and extended on one or first end portion 24 thereof and having an outer diameter smaller than that of the nut member 20 for forming or defining a peripheral shoulder or surface 25 in the nut member 20 and preferably perpendicular to the barrel 23.

The nut member 20 further includes a number of screw holes 26 formed therein, such as formed in the one or first end portion 24 thereof, and/or formed in the peripheral surface 25 of the nut member 20 and parallel to the barrel 23 and the bore 21 of the nut member 20. It is preferable, but not necessary that the nut member 20 further includes a peripheral bulge or swelling 27 formed or provided thereon, such as formed in the middle or intermediate portion thereof, and arranged or disposed or located between the barrel 23 and the nut member 20, and the peripheral swelling 27 includes an outer diameter greater than that of the barrel 23 and also greater than that of the nut member 20 and includes an outer peripheral recess 28 formed in the outer peripheral portion thereof for receiving or engaging with a number of other bearing elements 80, such as roller or ball bearing elements 80. The peripheral surface 25 is formed in the outer side portion of the peripheral swelling 27 and faced or directed toward the barrel 23 of the nut member 20.

A tube or tubular member or conduit or barrel or sleeve 30 includes a bore or chamber 31 formed therein for receiving or engaging with the nut member 20, and includes an inner peripheral swelling or bulge or protrusion 32 extended radially and inwardly into the chamber 31 thereof, in which the inner peripheral protrusion 32 includes an inner diameter greater than that of the nut member 20 and the peripheral swelling 27 for allowing the bearing elements 80 to be received or engaged between the sleeve 30 and the nut member 20, and includes two arched or curved side surfaces 33, 34 formed therein and faced or directed toward the opposite direction or faced away from each other, in which the first curved side surface 33 of the sleeve 30 is contacted or engaged with the first bearing elements 80 for solidly and stably anchoring or confining or retaining the first bearing elements 80 between the inner peripheral protrusion 32 of the sleeve 30 and the peripheral swelling 27 of the nut member 20. It is preferable that the curved side surfaces 33, 34 of the sleeve 30 each include a curvature equal to or slightly smaller than or greater than a quarter of a circle.

One or more (such as two) arched or curved gaskets or segments or members 35, 36, such as semi-circular members 35, 36, or members 35, 36 having a semi-circular structure, are selectively provided and contacted or attached or mounted or secured or engaged with the peripheral surface 25 of the nut member 20 and each include a number of orifices 37 formed therein and aligned with the screw holes 26 of the nut member 20, and a ring or tubular member 40 includes a bore or compartment 41 formed therein for receiving or engaging with the barrel 23 of the nut member 20 and for attaching or mounting or engaging onto the barrel 23 of the nut member 20, and includes a number of apertures 42 formed therein and aligned with the orifices 37 of the curved members 35, 36 and also aligned with the screw holes 26 of the nut member 20 for receiving or engaging with bolts or screws or fasteners 43 which are engaged through the apertures 42 of the tubular member 40 and the orifices 37 of the curved members 35, 36 and threaded or engaged with the screw holes 26 of the nut member 20 for coupling or retaining or securing the tubular member 40 and the curved members 35, 36 to the peripheral swelling 27 of the nut member 20.

The tubular member 40 further includes an outer peripheral recess or depression 44 formed in the outer peripheral portion thereof for receiving or engaging with a number of further bearing elements 88, such as roller or ball bearing elements 88. The other curved side surface 34 of the sleeve 30 is contacted or engaged with the bearing elements 88 for solidly and stably anchoring or confining or retaining the bearing elements 88 between the inner peripheral protrusion 32 of the sleeve 30 and the tubular member 40. The fasteners 43 may be threaded or engaged with or adjusted relative to the tubular member 40 and the curved members 35, 36 and the nut member 20 for adjusting the load or preload of the tubular member 40 and the curved members 35, 36 onto the nut member 20 and/or the load or preload of the bearing elements 80, 88 onto the sleeve 30. The tubular member 40 includes a length smaller than that of sleeve 30.

Figure 4:
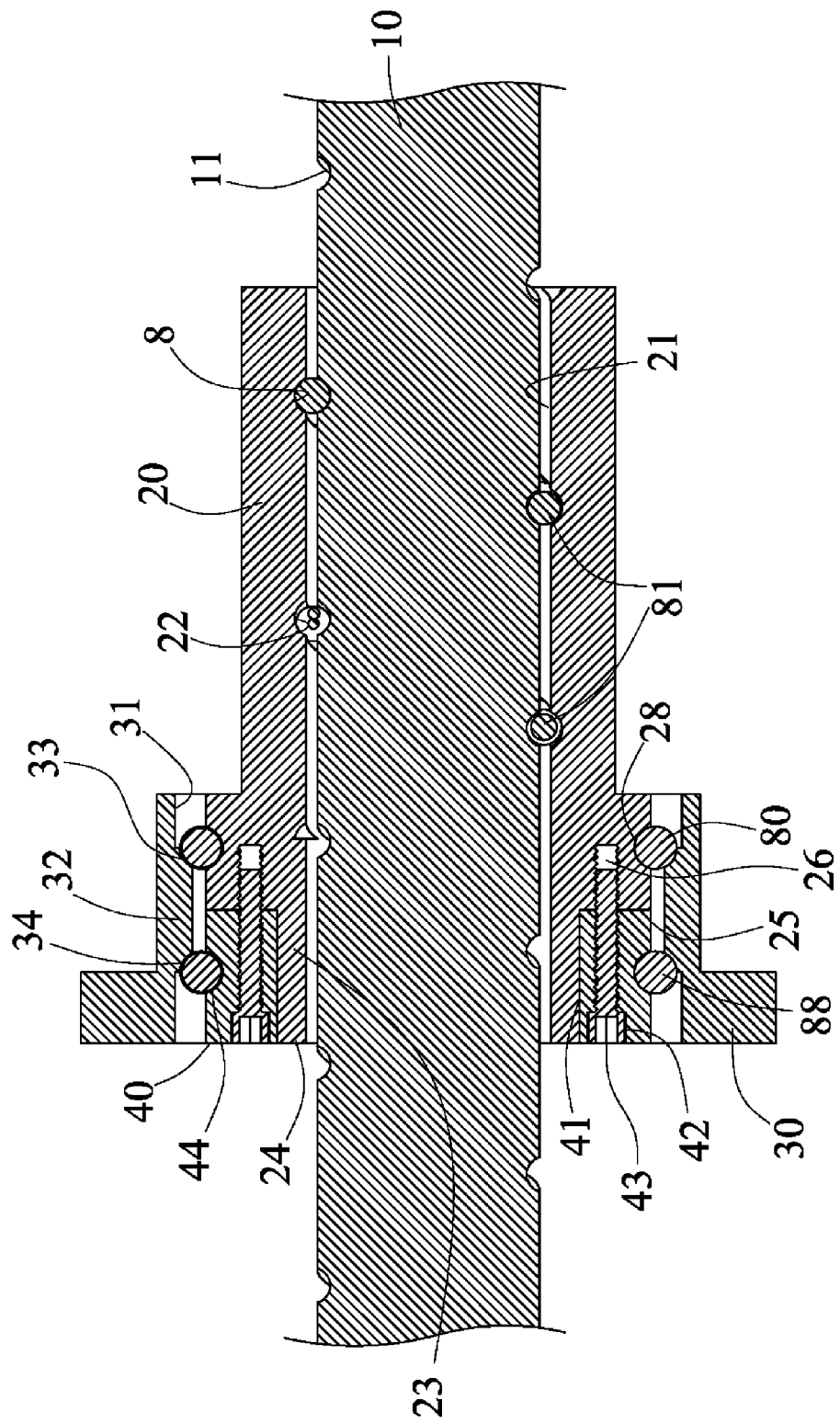
FIG. 4 is another partial cross sectional view similar to FIG. 3 illustrating the other application of the ball screw device.
Figure 5:
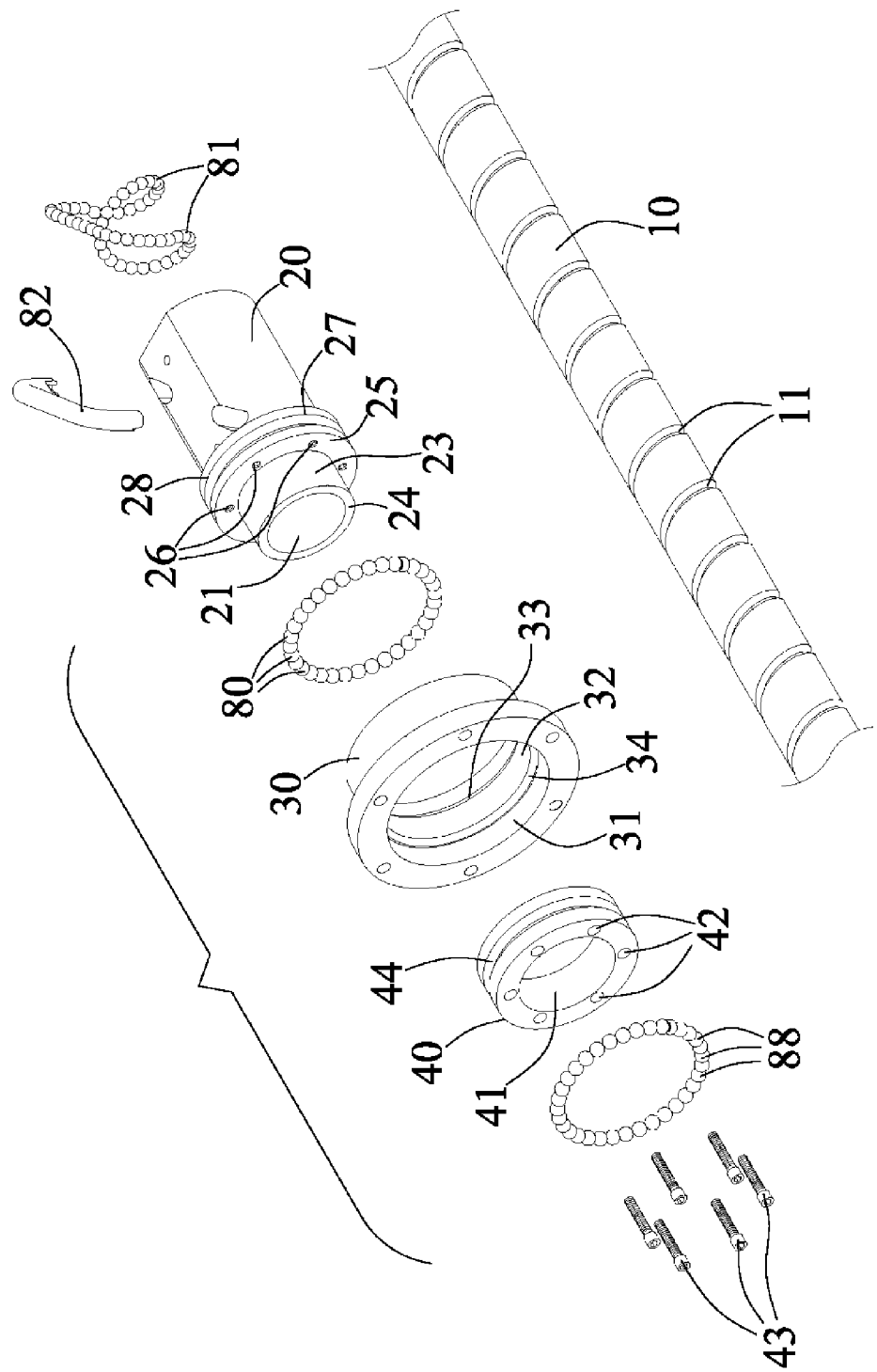
FIG. 5 is another partial exploded view of the ball screw device as shown in FIG. 4.

In operation, as shown in FIG. 3, the fasteners 43 may be threaded or engaged with or adjusted relative to the tubular member 40 and the curved members 35, 36 and the nut member 20 such that the load or preload of the tubular member 40 and the curved members 35, 36 onto the nut member 20 and/or the load or preload of the bearing elements 80, 88 onto the sleeve 30 may be altered or adjusted for solidly and stably anchoring or confining or retaining the bearing elements 80, 88 between the inner peripheral protrusion 32 of the sleeve 30 and the peripheral swelling 27 of the nut member 20 and the tubular member 40, and for allowing the bearing elements 80, 88 to be suitably and smoothly moved between the inner peripheral protrusion 32 of the sleeve 30 and the peripheral swelling 27 of the nut member 20 and the tubular member 40. As shown in FIGS. 4 and 5, the curved members 35, 36 may be optionally or selectively removed or disengaged from the nut member 20, and the tubular member 40 may be directly contacted or engaged with the peripheral surface 25 of the nut member 20 when the curved members 35, 36 are removed or disengaged from the nut member 20.

Figure 6:
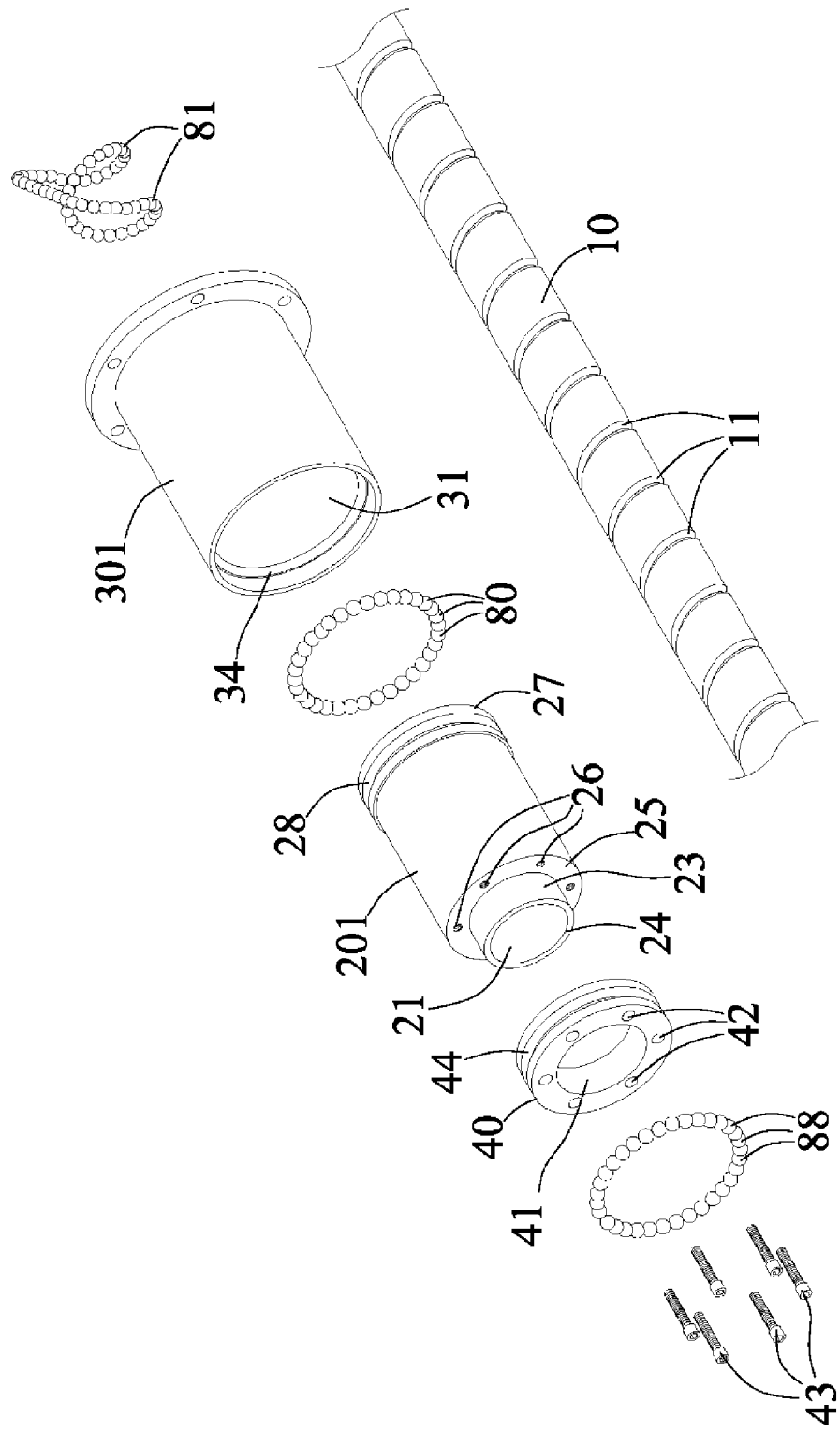
FIG. 6 is a further partial exploded view similar to FIGS. 1 and 5, illustrating the other arrangement of the ball screw device.
Figure 7:
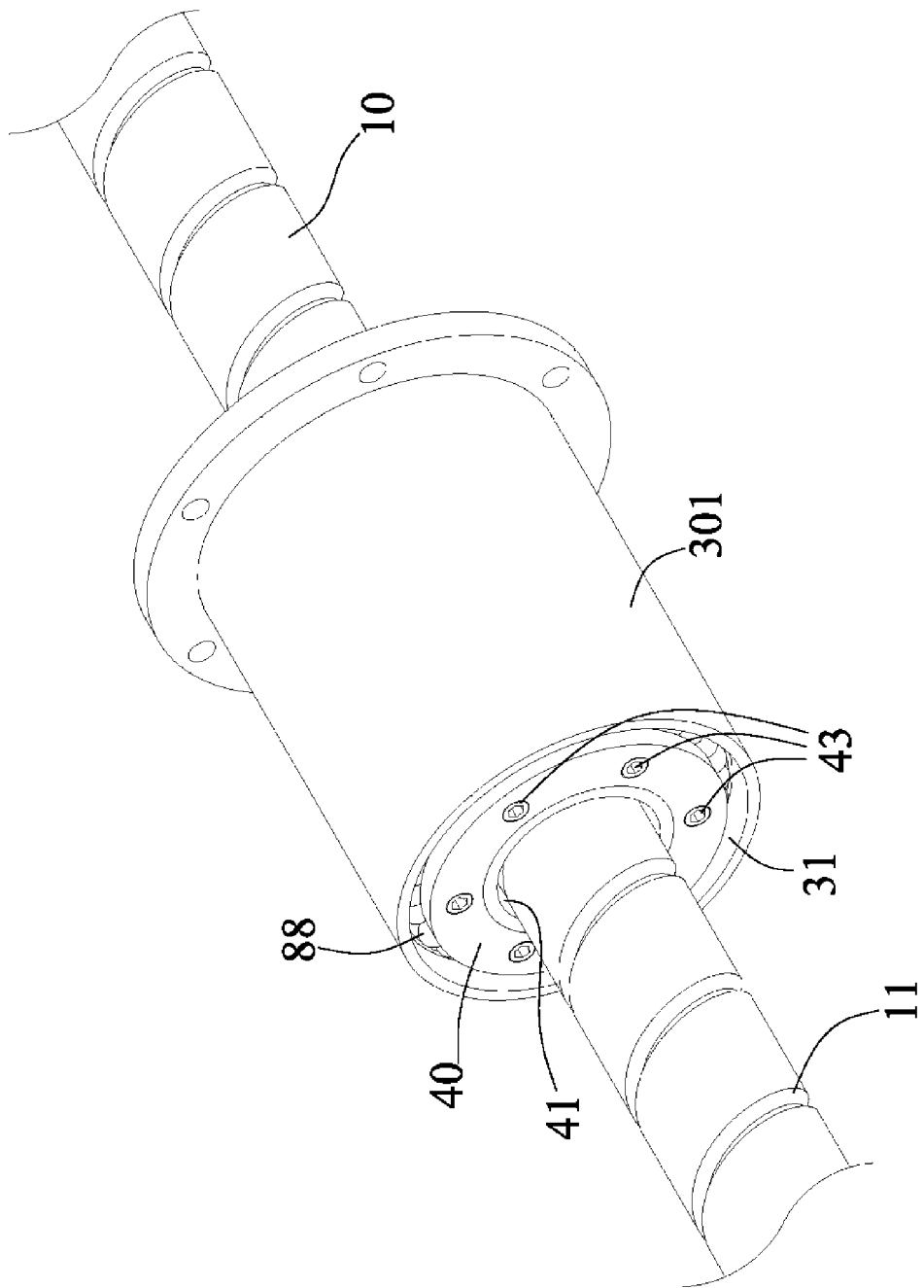
FIG. 7 is a partial perspective view of the ball screw device as shown in FIG. 6.
Figure 8:
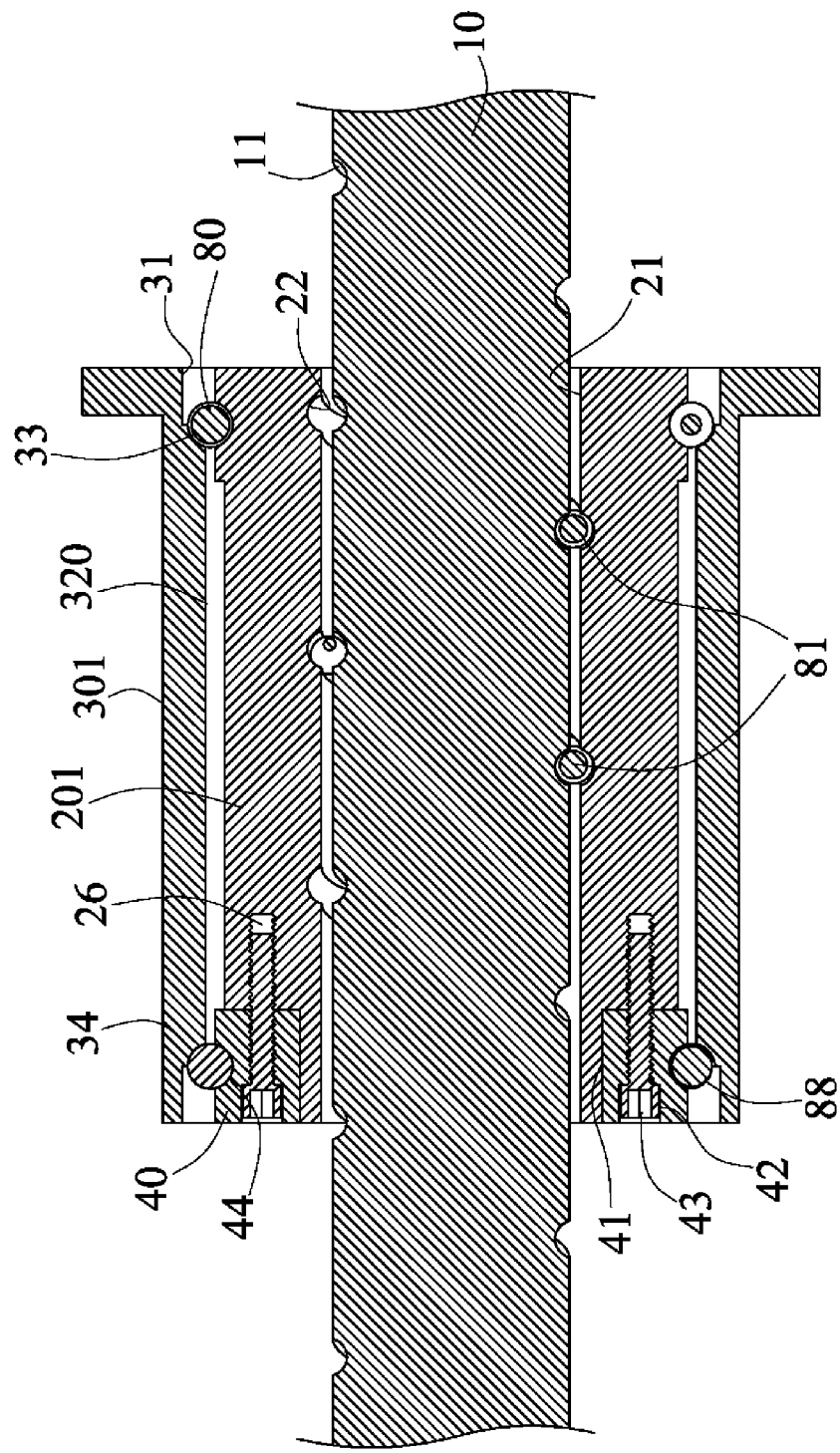
FIG. 8 is a partial cross sectional view taken along lines 8-8 of FIG. 7.

Alternatively, as shown in FIGS. 6-8, the nut member 201 may include a relatively greater length such that the outer peripheral recess 28 and the peripheral swelling 27 of the nut member 201 may be located farther away from the barrel 23; and the inner peripheral protrusion 320 of the sleeve 301 may also include a relatively greater length such that the curved side surfaces 33, 34 of the sleeve 301 may also be located farther away from each other for suitably engaging with the bearing elements 80, 88 and for allowing the bearing elements 80, 88 to be suitably and smoothly moved between the inner peripheral protrusion 320 of the sleeve 301 and the peripheral swelling 27 of the nut member 201 and the tubular member 40.

Accordingly, the ball screw device includes a preload structure or device for allowing the roller or ball bearing elements to be suitably attached or mounted or secured or engaged into the ball nut and for allowing the ball nut to be easily and quickly assembled and engaged onto the ball screw and for allowing the roller or ball bearing elements to be suitably and smoothly moved through the endless ball guiding passage of the ball screw device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device comprising:
an elongated screw including a helical groove formed therein,
a nut member including a bore formed therein for receiving and engaging with said screw, and including a helical groove aligned with said helical groove of said screw for forming an endless ball guiding passage between said nut member and said screw, said nut member including a first end portion, and including a barrel provided and extended on said first end portion of said nut member and having an outer diameter smaller than that of said nut member for forming a peripheral surface in said nut member, and including an outer peripheral recess formed in said nut member,
a plurality of bearing members engaged with said endless ball guiding passage between said nut member and said screw,
a plurality of first bearing elements engaged with said outer peripheral recess of said nut member,
a sleeve including a chamber formed therein for receiving and engaging with said nut member, and including an inner peripheral protrusion extended radially and inwardly into said chamber of said sleeve, said inner peripheral protrusion including an inner diameter greater than that of said nut member for allowing said first bearing elements to be received and engaged between said sleeve and said nut member, and said sleeve including a first curved side surface and a second curved side surface formed on said protrusion, said first curved side surface of said sleeve being engaged with said first bearing elements for anchoring and retaining said first bearing elements between said inner peripheral protrusion of said sleeve and said peripheral recess of said nut member,
a tubular member including a compartment formed therein for receiving and engaging with said barrel of said nut member and for engaging onto said barrel of said nut member, and including an outer peripheral depression formed therein, and
a plurality of second bearing elements engaged with said outer peripheral depression of said tubular member, and
said second curved side surface of said sleeve being engaged with said second bearing elements for anchoring and retaining said second bearing elements between said inner peripheral protrusion of said sleeve and said tubular member.

2. The ball screw device as claimed in claim 1, wherein said sleeve includes a length greater than that of said tubular member.

3. The ball screw device as claimed in claim 1, wherein said first curved side surface of said sleeve includes a curvature of a quarter of a circle.

4. The ball screw device as claimed in claim 1, wherein said second curved side surface of said sleeve includes a curvature of a quarter of a circle.

5. The ball screw device as claimed in claim 1, wherein said first and said second curved side surfaces of said sleeve are faced toward opposite direction.

6. The ball screw device as claimed in claim 1, wherein said nut member includes a plurality of screw holes formed in said peripheral surface of said nut member, and said tubular member includes a plurality of apertures formed therein and aligned with said screw holes of said nut member for receiving and engaging with fasteners.

7. The ball screw device as claimed in claim 6, wherein said screw holes of said nut member are parallel to said barrel and said bore of said nut member.

8. The ball screw device as claimed in claim 1, wherein said nut member includes a peripheral swelling formed and provided thereon, and said peripheral swelling includes an outer diameter greater than that of said barrel and great than that of said nut member.

9. The ball screw device as claimed in claim 1 further comprising a curved member attached and engaged between said peripheral surface of said nut member and said tubular member.

10. The ball screw device as claimed in claim 9, wherein said curved member includes a semi-circular structure.

11. The ball screw device as claimed in claim 1 further comprising two curved members attached and engaged between said peripheral surface of said nut member and said tubular member.

12. The ball screw device as claimed in claim 11, wherein said curved members each include a semi-circular structure.

* * * * *